(12) United States Patent
Bailey et al.

(10) Patent No.: US 11,762,934 B2
(45) Date of Patent: Sep. 19, 2023

(54) TARGET WEB AND SOCIAL MEDIA MESSAGING BASED ON EVENT SIGNALS

(71) Applicant: Oracle International Corporation, Redwood Shores, CA (US)

(72) Inventors: Alasdair John Joseph Bailey, Perth (GB); Christopher Scott Campbell, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 17/317,756

(22) Filed: May 11, 2021

(65) Prior Publication Data
US 2022/0365998 A1    Nov. 17, 2022

(51) Int. Cl.
| G06F 16/9538 | (2019.01) |
| G06F 16/951 | (2019.01) |
| G06N 20/00 | (2019.01) |
| H04L 29/08 | (2006.01) |
| H04L 9/32 | (2006.01) |
| H04L 67/50 | (2022.01) |

(52) U.S. Cl.
CPC ........ *G06F 16/9538* (2019.01); *G06F 16/951* (2019.01); *G06N 20/00* (2019.01); *H04L 9/3236* (2013.01); *H04L 67/535* (2022.05)

(58) Field of Classification Search
CPC ... H04L 9/3236; H04L 67/535; G06Q 10/103; G06Q 30/01; G06Q 30/02; G06Q 50/01; G06F 16/951; G06F 16/9535; G06F 16/9538
See application file for complete search history.

(56) References Cited

U.S. PATENT DOCUMENTS

| 6,845,361 | B1* | 1/2005 | Dowling ............... H04L 69/165 |
| | | | 705/13 |
| 7,685,575 | B1 | 3/2010 | Fareed |
| 8,230,062 | B2 | 7/2012 | Newton |
| 8,655,938 | B1 | 2/2014 | Smith et al. |
| 8,676,875 | B1 | 3/2014 | Smith et al. |
| 8,712,953 | B2 | 4/2014 | Beringer et al. |
| 8,856,232 | B1 | 10/2014 | Swerdlow et al. |
| 9,262,517 | B2 | 2/2016 | Feng et al. |

(Continued)

OTHER PUBLICATIONS

Gnip—Data collector, https://gnip.com/realtime/data-collector/, Mar. 18, 2016.

(Continued)

*Primary Examiner* — Etienne P Leroux
(74) *Attorney, Agent, or Firm* — Invoke

(57) ABSTRACT

Embodiments described herein include receiving an application flow defining logic for triggering automated actions for a candidate post on one or more web-based communication channels. An artificial intelligence (AI) powered web crawler may crawl a set of websites for target content. Responsive to identifying target content, machine learning may be leveraged to identify an entity name for an entity that is a subject of the target content and associate the entity with one or more event categories. Based on the event categories, a segment may be generated at runtime for the application flow where segment membership was not known at the time the application flow was defined or before application runtime.

20 Claims, 15 Drawing Sheets

(56) References Cited

U.S. PATENT DOCUMENTS

| | | | |
|---|---|---|---|
| 9,330,119 B2 | 5/2016 | Chan et al. | |
| 9,392,049 B2 | 7/2016 | Ennis et al. | |
| 9,436,758 B1 | 9/2016 | Lewis et al. | |
| 9,442,984 B2 | 9/2016 | Smith et al. | |
| 9,460,412 B2 | 10/2016 | Gates et al. | |
| 9,536,269 B2 | 1/2017 | Chang et al. | |
| 9,734,722 B1 | 8/2017 | Markey et al. | |
| 10,019,988 B1 | 7/2018 | Chan et al. | |
| 10,193,698 B1 | 1/2019 | Das et al. | |
| 10,248,667 B1 | 4/2019 | Agrawal et al. | |
| 10,304,081 B1 | 5/2019 | Boshy et al. | |
| 10,462,195 B2 * | 10/2019 | Tuculescu | H04L 65/403 |
| 10,530,714 B2 | 1/2020 | Ioannou et al. | |
| 10,972,411 B2 | 4/2021 | Ioannou et al. | |
| 11,080,605 B1 | 8/2021 | Yarbrough et al. | |
| 11,363,500 B1 | 6/2022 | Matsimanis et al. | |
| 2007/0265864 A1 | 11/2007 | Chess et al. | |
| 2009/0064003 A1 * | 3/2009 | Harris | G06F 16/958 707/E17.014 |
| 2009/0106603 A1 | 4/2009 | Dilman et al. | |
| 2009/0234835 A1 | 9/2009 | Galvin et al. | |
| 2009/0319288 A1 | 12/2009 | Slaney et al. | |
| 2011/0067099 A1 | 3/2011 | Barton et al. | |
| 2012/0046936 A1 | 2/2012 | Kandekar et al. | |
| 2012/0158476 A1 | 6/2012 | Neystadt et al. | |
| 2012/0185735 A1 | 7/2012 | Sambamurthy et al. | |
| 2012/0290562 A1 | 11/2012 | Wable et al. | |
| 2012/0296845 A1 | 11/2012 | Andrews et al. | |
| 2013/0073378 A1 | 3/2013 | Naveh et al. | |
| 2013/0166379 A1 | 6/2013 | Ehindero et al. | |
| 2013/0290458 A1 | 10/2013 | Morris et al. | |
| 2013/0325550 A1 | 12/2013 | Varghese et al. | |
| 2014/0006977 A1 | 1/2014 | Adams | |
| 2014/0019225 A1 | 1/2014 | Guminy et al. | |
| 2014/0074551 A1 | 3/2014 | Setayesh et al. | |
| 2014/0074844 A1 | 3/2014 | Subramanian et al. | |
| 2014/0095420 A1 | 4/2014 | Chun et al. | |
| 2014/0156681 A1 | 6/2014 | Lee et al. | |
| 2014/0180788 A1 | 6/2014 | George et al. | |
| 2014/0188863 A1 | 7/2014 | Grauman et al. | |
| 2014/0189354 A1 | 7/2014 | Zhou et al. | |
| 2014/0214495 A1 | 7/2014 | Kutty et al. | |
| 2014/0222604 A1 | 8/2014 | Yellapragada | |
| 2014/0280625 A1 | 9/2014 | Byrd et al. | |
| 2014/0295786 A1 | 10/2014 | Maier et al. | |
| 2015/0020086 A1 | 1/2015 | Chen et al. | |
| 2015/0066788 A1 | 3/2015 | Tebbe | |
| 2015/0081571 A1 | 3/2015 | Chauhan et al. | |
| 2015/0140924 A1 | 5/2015 | Marathe et al. | |
| 2015/0169587 A1 | 6/2015 | Silverman et al. | |
| 2016/0004529 A1 | 1/2016 | Xia et al. | |
| 2016/0055250 A1 | 2/2016 | Rush | |
| 2016/0063442 A1 | 3/2016 | Bennett et al. | |
| 2016/0125349 A1 * | 5/2016 | Joi | G06Q 10/10 705/345 |
| 2016/0148325 A1 | 5/2016 | Dhawan et al. | |
| 2016/0171110 A1 | 6/2016 | Gao et al. | |
| 2017/0003137 A1 | 1/2017 | Scofield | |
| 2017/0053298 A1 | 2/2017 | Sun et al. | |
| 2017/0061528 A1 | 3/2017 | Arora et al. | |
| 2017/0132230 A1 | 5/2017 | Muralidhar et al. | |
| 2017/0193531 A1 | 7/2017 | Fatourechi et al. | |
| 2017/0366641 A1 | 12/2017 | Fultz et al. | |
| 2018/0173713 A1 | 6/2018 | Lawbaugh | |
| 2019/0138651 A1 * | 5/2019 | Xiong | G06F 16/353 |
| 2020/0036660 A1 | 1/2020 | Ioannou et al. | |
| 2020/0084178 A1 | 3/2020 | Dreyer | |
| 2020/0117339 A1 | 4/2020 | Amitay et al. | |
| 2020/0126100 A1 * | 4/2020 | Goyal | H04N 21/812 |
| 2020/0301960 A1 * | 9/2020 | Lombardo | G06N 20/00 |
| 2020/0302197 A1 * | 9/2020 | Kench | G06F 16/5846 |
| 2021/0272394 A1 | 9/2021 | Cella | |
| 2021/0334454 A1 * | 10/2021 | Nguyen | G06V 30/412 |
| 2022/0188663 A1 | 6/2022 | Appel et al. | |

OTHER PUBLICATIONS

Gomadam et al., Data Enrichment Using Data Sources on the Web, AAAI Technical Report SS-12-04, Intelligent Web Services Meet Social Computing, pp. 34-38.

Guo et al., Linking Tweets to News A Framework to Enrich Short Text Data in Social Media, Proceedings of the 51st Annual Meeting of the Association for Computational Linguistics, vol. 1, Aug. 2013, pp. 239-249.

MDM Driven Data Enrichment, IBM InfoSphere Master Data Management, Version 11.3, Mar. 16, 2016, https://www.ibm.com/support/knowledgecenter/api/content/nl/en-us/SSWSR9_11.3.0/com.ibm.swg.im.mdmhs.sdfcintegration.doc/topics/c_mdmdrivenenrichment.html.

The Value of Social Data, Oracle social white paper, Dec. 2013, http://www.oracle-downloads.com/valueofsocial.pdf.

* cited by examiner

302

Filter Companies                                                              ✕

Q Search Filters                                          Clear Filter

| Basic Company Info | Headcount | Headcount |
|---|---|---|
| Industry Definition | Location | no minimum time shortcuts like   no maximum |
| Financial Info | Account Scoring | ☐ Include empty values |
| Technologies | Founded | ☐ Limit to data verified by DataFox analysts in past year |
| Signals | CEO Name | |
| CRM/Custom Data | Company Relationships | |
| Lists | Company Name | |
| Conferences | | |

| SAVE FILTERS AS DEFAULT | CLEAR ALL FILTERS | APPLY DEFAULT FILTERS | APPLY |

FIG. 3A

Filter Signal ✕

Q Search Filters

Growth
Financial
People — 4
Recognition
Events and Marketing
Corporate Update
Negative News — 2 ⌃
General News

Negative News                                              [ TURN NEGATIVE NEWS ON ]

☐ Bankruptcy
  Companies files for Bankruptcy
☐ Industry or Competitive
  Company competitor's gain a unique advantage or the market downturns
☐ Customer Dissatisfaction
  Companies customers voice their dissatisfaction online
☐ Financial Challenges
  Companies report signs of financial instability
☑ Executive or Key Person Departure
  Companies lose or fire an executive
☑ Layoffs
  Companies terminates a large number of employee contracts
☐ Legal Issues
  Companies have experienced legal difficulties
⇧ Regulatory Issues
  Companies encounter problems with governing law
☐ Security Challenges
  Companies report or are tied to security vulnerabilities

[ SAVE SIGNAL FILTERS AS DEFAULT ]   [ TURN ALL SIGNALS FILTERS ON ]   [ APPLY ]

Filter Companies                                                                                                    ✕

| Search Filters | | |
|---|---|---|
| Basic Company Info ○ | Corporate Update | Negative News Signals |
| Industry Definition | Events and Marketing | △ Bankruptcy |
| Financial Info | Financial | △ Industry or Competitive |
| Technologies | Growth | △ Customer Dissatisfaction |
| Signals | Negative News | △ Financial Challenges |
| CRM/Custom Data | People | △ Executive or Key Person Departure |
| Lists | Recognition | ▽ Layoffs |
| Conferences | General News | Time Frame                         Clear Filter |
| | | [ Within the last year              ⌄ ] |
| | | Number of Signals |
| | | [ no minimum time shortcuts ]  [ no maximum ] |
| | | △ Legal Issues |
| | | △ Regulatory Issues |
| | | △ Security Challenges |
| | | △ Turbulence |

[ SAVE FILTERS AS DEFAULT ]  [ CLEAR ALL FILTERS ]                    [ APPLY DEFAULT FILTERS ]  [ APPLY ]

FIG. 3C

Company Search

Filter By: | State or Province ✗ | Employee Growth ✗ | Leadership Change ✗ | Executive or Key Person Departure ✗ | Layoffs ✗

Data  Summary  Conferences

[ADD TO LIST]

| | | Name | ▽ Technographics | ▽ Technographic vendors |
|---|---|---|---|---|
| 1 | ☐ | AT&T Inc. | | 24/7 Customer, Inc., A10 Networks, Inc., Ab Initi |
| 2 | ☐ | McKesson Corporation | Salesforce SPF, Salesfo | 8X8, Inc., AccessData Group, Inc., Acoustic LP, Ac |
| 3 | ☐ | Schlumberger | | 3D Systems, Inc., AccessData Group, Inc., Accrue |
| 4 | ☐ | Jacobs | Salesforce SPF | 3D Systems, Inc., AccessData Group, Inc., Accrue |
| 5 | ☐ | Exxon Mobil Corporation | Salesforce, Pardot | ABBY Solutions, Ltd., Accruent, LLC, Acronis Int |
| 6 | ☐ | American Airlines | Salesforce | 123Signup AMS, Inc., Ab Initio Software, LLC, Ac |
| 7 | ☐ | Halliburton | Pardot, Salesforce | AccessData Group, Inc., Adaptive Computing, Ad |
| 8 | ☐ | USAA | Salesforce, Pardot | Ab Initio Software, LLC, Accenture PLC, Aceyus, I |
| 9 | ☐ | Texas Instruments | | 3CX, Aberdeen Group, LLC, Accenture PLC, Acxic |

| Add a Filter + | | | CREATE DYNAMIC LIST |
|---|---|---|---|
| | | | 416 companies |
| ⌄ Technographic Categories | | ⌄ LinkedIn Url | ⌄ Acc |
| Contact Center Management, Network Management (Hardware), E | | http://www.linkedin.com/company | |
| Collaboration, Legal and professional Services Management, System | | http://www.linkedin.com/company | |
| Visualization Software, Legal and professional Services Management | | http://www.linkedin.com/company | |
| Visualization Software, Legal and professional Services Management | | http://www.linkedin.com/company | |
| Document Management, Real Estate, Data Archiving, Back-Up & Re | | http://www.linkedin.com/company | |
| Marketing Performance Measurement, Enterprise Business Solution | | http://www.linkedin.com/company | |
| Legal and Professional Services Management, System Security Serv | | http://www.linkedin.com/company | |
| Enterprise Business Solution (EBS), Software – Other, Commerce, | | http://www.linkedin.com/company | |
| Telephony, Marketing Performance Measurement, Operating System | | http://www.linkedin.com/company | |

TARGET WEB AND SOCIAL MEDIA MESSAGING BASED ON EVENT SIGNALS

CROSS-REFERENCE TO RELATED APPLICATIONS

This application is related to U.S. patent application Ser. No. 15/418,191, entitled "CONDITIONAL AUTOMATIC SOCIAL POSTS", now U.S. Pat. No. 10,530,714; and U.S. patent application Ser. No. 15/385,621, entitled "SOCIAL MEDIA ENRICHMENT FRAMEWORK", now U.S. Pat. No. 10,380,610, the entire contents for each of which are incorporated by reference as if set forth in their entirety.

FIELD OF THE DISCLOSURE

The present disclosure relates to systems and methods for crawling the web to extract and verify entity event information to enhance entity-based functionality in software applications and cloud services.

BACKGROUND

Businesses and other entities are increasingly leveraging technology to enhance engagement with customers and other consumers of goods and services. For example, customer relationship management (CRM) and social relationship management (SRM) systems are applications through which entities may automate various aspects of managing interactions through social media and other platforms with former, current, and future customers. Such software applications typically integrate a variety of components into a unified service to facilitate engagement with consumers. Example components may include a listening component that monitors posts on social media and/or other channels for relevant content, an analytic component that analyzes posts detected on one or more platforms, and a publishing component that allows users to post content on multiple platforms through a single interface. By integrating these components into a single unified service, users may quickly react to and provide relevant content through various platforms.

Customer service representatives, response teams, marketing professionals, and other employees are often reluctant to offload tasks onto machines for fear of missing important information, which may result in negative engagement or missed engagement opportunities with customers. Nevertheless, users have incorporated software solutions, such as CRM and SRM systems, into their strategy to help organize, arrange, and highlight relevant content when they are otherwise unable to manually read all of the content. Once the relevant content is arranged and highlighted in a graphical user interface (GUI), marketing or other personnel may analyze the highlighted data to determine the best way to respond, if any. Using enterprise software systems in this manner has helped users address the most critical content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A illustrates an example interface page for defining filter criteria based on company attributes in accordance with some embodiments.

FIG. 3B illustrates an example interface page for defining filter criteria based on event signals in accordance with some embodiments.

FIG. 3C illustrates an example interface page for defining filter criteria based on time-sensitive event signals in accordance with some embodiments.

FIG. 4 illustrates an example user interface page for presenting an entity list generated based on a set of specified filter criteria.

DETAILED DESCRIPTION

Figure 1:
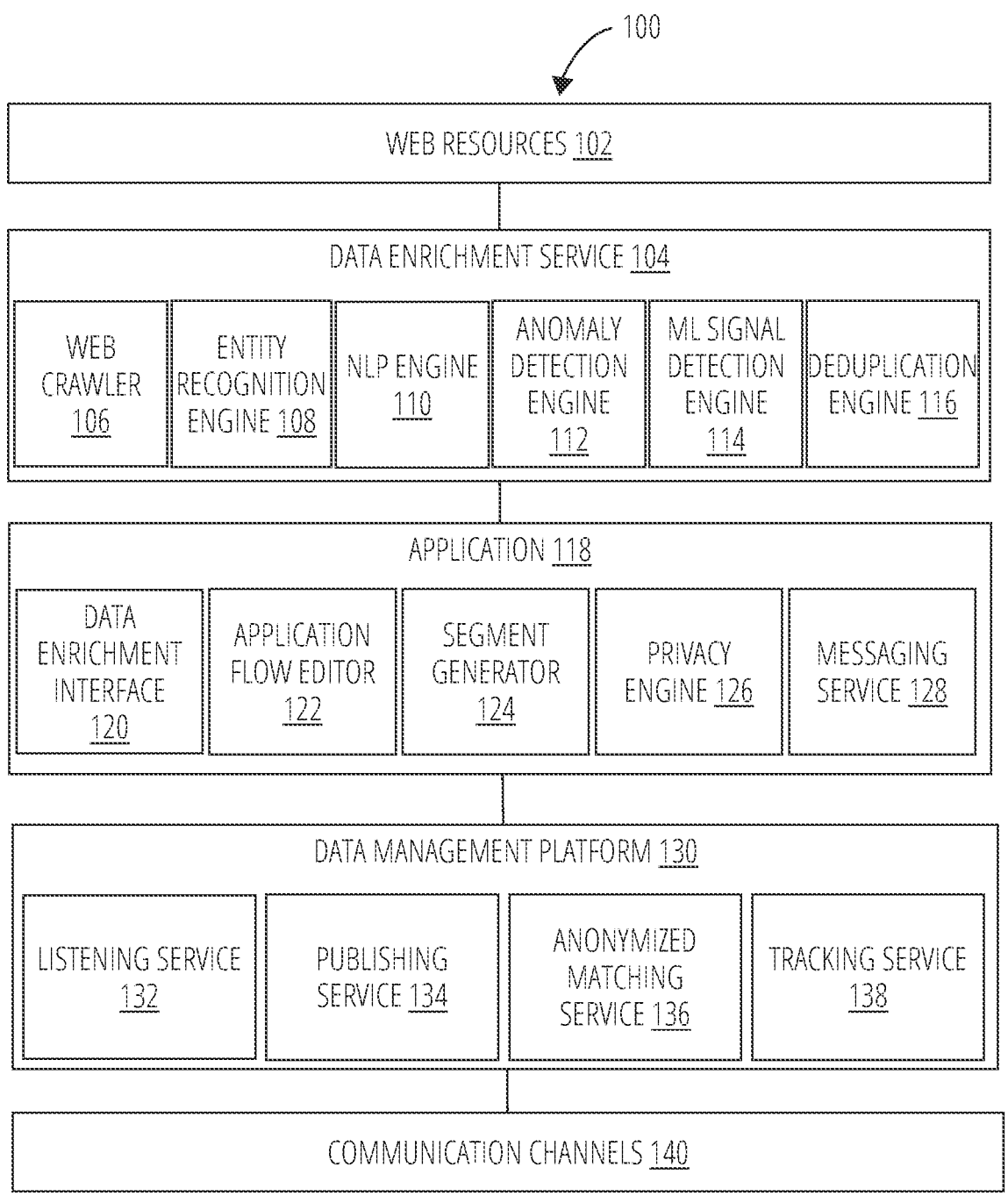
FIG. 1 illustrates a system for targeting web and social media content based on event signals in accordance with some embodiments

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In various embodiments, computer systems, stored instructions, and technical steps are described for leveraging artificial intelligence (AI), analytics, and automation to enrich data and enhance engagement actions. The techniques allow automated tasks to target people associated with an entity based on recent events relevant to the entity even though the target segment may not be known to the user offloading the automated tasks to the system. For example, a user may define, using a user interface (UI) of the system, an automated post or other action that targets an undefined segment. The system may automatically generate a segment for the task in a manner that optimizes the likelihood of positive engagement, accounting for recent events relevant to candidate segment members and entities that employ target recipients. If the system determines that a candidate recipient of an action will react positively given a set of one or more recent events, then the system may add the recipient to the segment. Conversely, if the system determines that a candidate recipient will respond negatively, then the system may exclude the recipient from the segment.

In some embodiments, a system includes an AI-powered web crawler to generate and populate a segment for a defined task. The AI-powered web crawler may find and categorize content reflecting recent events that are potentially relevant to a set of entities. The AI-powered web crawler may further leverage machine learning to identify reliable web-based sources of news, perform named entity recognition to determine whether web content is relevant to a set of target entities, and classify web content. For example, if the web crawler finds target content, such as a news article on a trusted website, then one or more machine learning models may be applied to (a) identify one or more named entities that are the subject of the content and (b) assign one or more event category labels for the target content Based on the output of the one or more machine learning models, the system may associate an entity with one or more event categories, also referred to herein as event signals. The system may then generate segments based in part on which entities are associated with a particular event category.

In some embodiments, users may define filter criteria or parameters for generating a segment. For example, the filter criteria may specify which event categories the system uses to select and/or exclude entities. Additionally or alternatively, event categories may be weighted, with weights assigned by users or machine-learning processes, and entities may be filtered as a function of the assigned weights. Once the system identifies entities satisfying the filter criteria, the system may then identify a set of one or more individuals associated with each entity and populate the segment with all or a subset of data records for these individuals. Individuals that are employees or members of entities that do not satisfy the filter criteria may be excluded from the segment.

In some embodiments, event signals for an entity are time sensitive. If the event did not occur within a specified time period, then the system may give the event little or no weight when generating the segment. As a result, individuals associated with the entity may be excluded when they otherwise would have been included in a segment or included when they otherwise would have been excluded from the segment if the event was fully weighted.

In some embodiments, the system allows users to define application flows where recipients of the targeted actions are not known when the application flow is received. For example, a user may define an application flow for triggering a conditional automated post on a social media channel or website without specifying a list of recipients for the post. Based on the output of the AI-based web crawler and machine learning models, the system may determine which entities and associated individuals are most likely to have positive engagement with the post and/or find the post relevant. The system may populate a segment and present the segment to a user for review. The user may then verify or modify the system-generated segment. In other embodiments, the system may proceed with serving the automated post or otherwise executing the application flow using the segment information without requiring further review.

The techniques described herein further provide for system-generated alerts and actionable insights based on the behavior of target entities. For example, the AI-powered web crawler may find and classify content describing actions taken by a competitor to a company. The system may then display or provide real-time alerts to users based on the competitor news in the context of the company. By leveraging machine learning, the system may not only present information about what is occurring within an organization but also provide context and news about the ecosystem in which the organization operates, which may be relevant to what actions are taken in the near-term future.

In some embodiments, the AI-powered engine and ML models are included as part of a cloud service that integrates or interacts with client-side applications, such as enterprise software systems or other externally linked cloud services. The engine may continuously or periodically crawl verified sites for information related to target entities and tag the content and/or entities using ML classification techniques. A client-side application or service may then consume the insights provided by the cloud service to enrich data and execute application-specific logic.

One or more embodiments described in this Specification and/or recited in the claims may not be included in this General Overview section.

2. System Architecture

FIG. 1 illustrates system 100 for targeting web and social media content based on event signals in accordance with some embodiments. As illustrated in FIG. 1, system 100 includes data enrichment service 104, application 118, and data management platform 130. In other embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Referring to FIG. 1, data enrichment service 104 includes applications, tools, and logic that automate data collection. Data enrichment service 104 may leverage NLP and ML techniques to scan the web and generate reliable entity data and event signals. In some embodiments, data enrichment service 104 includes web crawler 106, entity recognition engine 108, NLP engine 110, anomaly detection engine 112, ML signal detection engine 114 and deduplication engine 116.

In some embodiments, web crawler 106 is configured to crawl web resources 102 and scrape or otherwise extract target content when found. Web resources 102 may include websites, webpages, social media content, cloud services, servers, databases, and/or other computing resources accessible via the World Wide Web. Web crawler 106 may fetch web resources 102, such as webpages, using the Hypertext Transfer Protocol (HTTP) and/or other communication protocols of the Internet Protocol (IP) suite. Web crawler 106 may be configured to restrict crawling to a specific set of websites and webpages based on predetermined or learned patterns to increase the likelihood that the data is reliable and reduce processing overhead. For example, web crawler 106 may restrict crawling to trusted news websites, company websites, and/or verified social media channels. Further, web crawler 106 may be configured to follow the robots exclusion protocol, as encoded in a robots.txt file, for each visited website to prevent web crawler 106 from processing areas of a website that have been classified as restricted.

Entity recognition engine 108 uses machine learning and natural language processing to locate and classify named entities in target content found by web crawler 106. In some embodiments, entity recognition engine 108 receives a webpage as input, tokenizes the data, and applies an NLP-based ML model to identify which tokens correspond to named companies. Applying the ML model may include generating one or more ML feature vectors for the web page based on the tokens and feeding the input ML vectors into an ML model, such as an artificial neural network that performs forward propagation using the ML vector. An ML model may be trained to learn contextual patterns in the sequence of tokens. For instance, the ML model may extrapolate meaning based on what tokens precede and/or come after a given token. A token in one context may correspond to an entity name but in another context may have a different meaning. For example, the word "oracle" may be used to refer to a company or have a different meaning depending on the context in which it is used. The trained ML model may learn the different contexts such that when it is applied, it may accurately distinguish between when a given token is used to refer to a company and when it is used for another purpose.

In some embodiments, NLP engine 110 parses webpages retrieved by web crawler 106 for relevant information. NLP engine 110 may process unstructured text and other content from a variety of sources, including news articles, press releases, government filings, social media, job listings, and blog posts. If relevant information is found, NLP engine 110 may store and incorporate the data into a database and/or other data repository.

Anomaly detection engine 112 identifies anomalies in entity data that is extracted. For example, NLP engine 110 may not be able to verify a company's location, headcount, and/or other entity information within a threshold level of confidence. Anomalies may be added to an audit queue or otherwise sent to a human analyst team to verify the accuracy of the entity data. An auditor may then verify the data accuracy or make changes. The labeled example may then be used as training data to feed back into the ML models. By using human-in-the-loop supervision for anomalous cases, data enrichment service 104 may increase the reliability of the enriched data and insights provided to consuming applications, thereby improving the prediction capabilities of the trained ML models.

ML signal detection engine 114 applies one or more ML models to classify events based on the contents of web content retrieved by web crawler 106. In some embodiments, ML signal detection engine 114 categorizes extracted content and/or entities referenced in the content with one or more category tags. Event categories, which may also be referred to as signal classifiers or event buckets, may be pre-defined. Example categories include new product launches, expansion, layoffs, acquisition, initial public offering (IPO), and personnel changes. The event classifiers may vary depending on the particular implementation and be configurable by an end user. A subset of the assigned classifiers may be selected for audit by a human analyst team to ensure accuracy and improve the ML model results. When an auditor verifies or changes an event classifier, the labeled example, including the event classifier and ML feature vector, may be used to retrain and/or tune the ML model.

Deduplication engine 116 consolidates data points and matches event classifiers to verified companies. For example, a given event classifier may be generated for several different sources that describe the same event even though each source may describe the event using different combinations and sequences of words. Deduplication engine 116 may merge the separate articles into a single data point such that different sources are not treated as describing separate events. As a result, duplicate event signals are not generated for a company for a single event.

Application 118 may correspond to enterprise software or a cloud services that consumes data provided by data enrichment service 104. Application 118 may be configured to perform application-specific functions based on the data, such as generating segments for an application flow, posting on social media channels, and/or executing other automated actions. Application 118 may pull data from data enrichment service 104 or the data may be pushed to application 118, depending on the particular implementation.

In some embodiments, data enrichment service 104 exposes one or more functions to application 118 via one or more application programming interface (API) endpoints. For example, application 118 may send an HTTP request to the API endpoint to periodically retrieve new event signals from data enrichment service 104, such as on a daily or weekly basis. In response, data enrichment service 104 may provide event signals that are new or updated within a threshold timeframe.

Although only one application is depicted, data enrichment service 104 may support a plurality of applications. In some embodiments, data enrichment service 104 is a cloud service that allows one or more subscribers or "tenants" to access enriched company data and actionable insights. A cloud service allows various tenants to share resources, which may reduce costs and reduce the burden of managing infrastructure. For example, a cloud service allows the results of a human-in-the-loop data verification to be shared with multiple subscribing entities. Thus, each subscribing entity does not need to implement their own verification system to ensure data accuracy. Additional embodiments and/or examples relating to computer networks are described below in Section 7, titled "Computer Networks and Cloud Networks."

In some embodiments, application 118 includes data enrichment interface 120, application flow editor 122, segment generator 124, privacy engine 126, and messaging service 128. Data enrichment interface 120 may generally include APIs and/or communication protocols for communicating and integrating with data enrichment service 104. For example, data enrichment interface 120 may establish communications with an API endpoint exposed by data enrichment service 104, issue HTTP requests or calls via the API endpoint, and process responses. Data enrichment interface 120 may poll data enrichment service 104 for new event signals or be configured such that data enrichment service 104 may push new event signals to application 118.

Application flow editor 122 provides an interface, such as a GUI, through which users may create, edit, and otherwise modify a sequence of executable steps for performing one or more automated tasks. For example, users may define a sequence of steps and criteria for triggering an automated post one or more social media channels or a marketing message within a webpage. The interface may allow users to specify the design and content of the automated post or message. In some cases, logic may be defined for adjusting the design and/or contents of a post based on runtime conditions.

Segment generator 124 generates segment information for automated task flows based on event signals received from data enrichment service 104. In some embodiments, segment generator 124 identifies how a recent event is classified and what entities are tagged. Segment generator 124 may then identify, based on an identifier for the entity, a plurality of contacts associated with the entity. The contact information may be maintained within a database associated with application 118. Segment generator 124 may populate the segment with all or a subset of the individuals associated with an entity that are found in the contact database.

Privacy engine 126 is configured to enforce data privacy constraints. For example, individual contact data and personal identifying information (PII) of customers is sensitive and may be subject to regulations and other restrictions preventing sharing of the data. In some embodiments, privacy engine 126 replaces sensitive data with anonymized data, such as an anonymized hash identifier or dummy data. Privacy engine 126 may apply privacy filters to data that is shared externally, such as data shared with data enrichment service 104 or data management platform 130. Thus, external platforms, which may be managed by a separate entity, are prevented from discerning or otherwise identifying segment membership even though the external platforms may use the segment data to execute platform-specific functions or provide data to application 118 that is used to generate the segment membership.

In some embodiments, application includes messaging service 128 to directly message members of a segment. Messaging service 128 may provide autoreply functionality to set up and publish conditional automated posts through social media platforms, email services, short messaging service (SMS), blog posts, Internet message boards, and/or other communication channels. Messaging service may expose an interface, such as an API or GUI, through which users may set up rules and conditions for triggering posting of automated messages. Messaging service 128 may include a rules engine to process user-provided logic to determine if/when to trigger an automated message or some other automated response. The rules engine may also process user-provided to logic to determine other characteristics of how to generate a conditional social post, such as what content to include in the automated message, on what channels to post the automated message, whether to make the post public or private, and/or other post attributes.

In some cases, application 118 may not have technical tools or access to reach segment members via certain communication channels. For example, application 118 may not be able to post a campaign message via a particular webpage hosted by another entity. Application 118 may instead rely on an external service, such as data management platform 130, to reach segment members for a candidate post. Application 118 may provide anonymized segment data to data management platform 130 to conform with Internet privacy laws and regulations including the General Data Protection Regulation (GDPR).

Data management platform 130 leverages big data and artificial intelligence techniques to collect and manage data that may be used to target segments through communication channels 140. In some embodiments, data management platform 130 includes listening service 132, publishing service 134, anonymized matching service 136, and tracking service 138. Listening service 132 may crawl, scan, or monitor computing resources to identify audience segments. For example, listening service 132 may extract cookie identifiers from HTTP cookies, mobile identifiers from mobile devices, social network identifiers from social media webpages, and/or other identifiers. Data management platform 130 may use machine learning to automatically build profiles for internet users based on the data extracted by listening service 132. Listening service 132 may further be configured to detect online interactions of users in a segment to search for opportunities to serve posts or direct other targeted actions to segment members.

Publishing service 134 posts or otherwise publishes messages on communication channels 140. Publishing service 134 may post messages publicly such that the message is available for viewing to all users of a particular channel, such as all social media users on a social media channel, or may publish posts privately to a targeted set of users or to a specific user. Published posts may include text, images, audio content, video content, or some combination thereof to convey information to consumers via communication channels 140. Publishing service 134 may publish a post on a single channel, across multiple channels, via a direct or group email, or through any other network channel. Publishing a post may including inserting code for rendering the message by a browser application for a visited webpage, generating a social media message on a social media platform, posting on an internet message board or forum, sending an email or SMS message, and/or otherwise rendering content to a targeted recipient or group of recipients.

In some embodiments, anonymized matching service 136 searches for matches between anonymized segment data provided by application 118 and anonymized segment data extracted by listening service 132. For example, anonymized matching service 136 may match hash values obtained by applying a cryptographic hash function to an email address or other string value that uniquely identifies a target recipient of a post. If a match is detected, then publishing service 134 may be invoked to post a message that is targeted to the segment member.

In some embodiments, tracking service 138 tracks response to posts, such as click-through rates, engagement, sentiment, and/or other response metrics. The metrics may track how effective the automatic segment generation was, which may be fed back into an ML model for further model training and/or tuning. The metrics may further be returned to application 118 and presented to users to help analyze and refine application flows.

3. Event Signals and Segment Generation

Events signals for an entity may be relevant to the likelihood that certain actions will be successful received by members of the entity. For example, a company expansion may increase the likelihood that employees of the company are seeking to increase inventory and/or support services. As another example, layoffs may be predictive that employees of the company are seeking to change positions or are likely to be receptive to lower costs support services. Data enrichment service 104 may leverage machine learning to gather and classify events in a manner that may be consumed by applications to enhance application-specific functionality.

Figure 2:
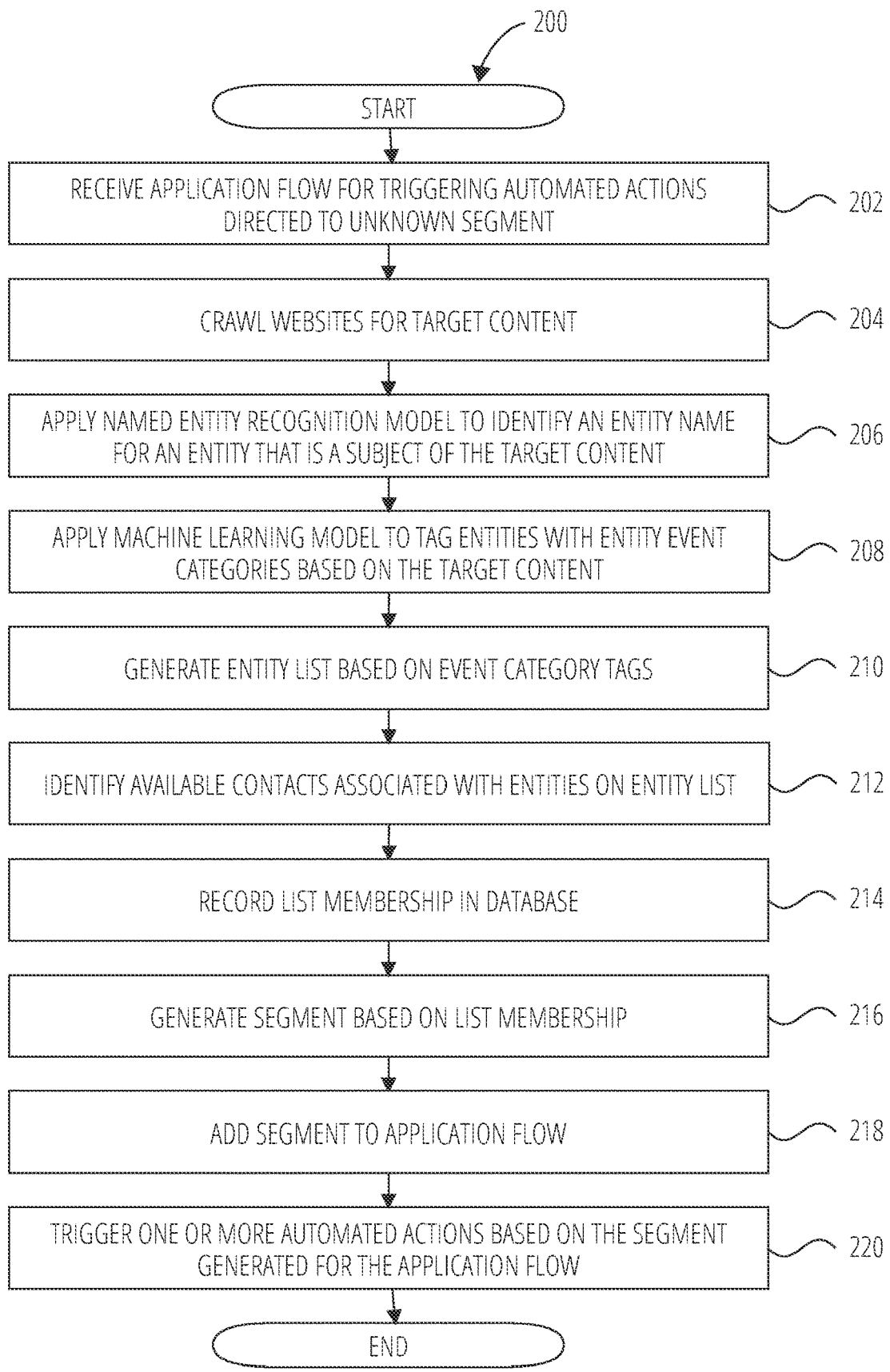
FIG. 2 illustrates an example process for targeting automated actions based on event signals in accordance with some embodiments.

FIG. 2 illustrates process 200 for targeting automated actions based on event signals in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, process 200 includes receiving an application flow for triggering one or more automated actions directed to an unknown segment (operation 202). The application flow may define a set of executable steps for triggering the set of one or more automated actions. For example, the one or more automated actions may include steps for generating, rendering, and publishing an automated conditional social media post. During runtime, application 118 may execute the application flow to determine if and when the conditions for making the social media post are satisfied, which social media platforms to target, what content, including images and/or text, to include in the social media post. In addition or as an alternative to triggering candidate posts, other actions may be triggered. Other examples include generating and sending analytic reports, modifying datafiles, and adjusting the configuration settings of a computing resource.

Process 200 further includes crawling a set of websites for target content (operation 204). In some embodiments, web crawler 106 restricts crawling to a set of trusted sites, such as reputable news websites, social media channels managed by verified entities, and government servers. Targeting crawling reduces the processing burden on web crawler 106 while enhancing the reliability of extracted content.

In some embodiments, web crawler 106 scrapes data from recent event articles. Web crawler 106 may search for articles within a webpage with an associated timestamp within a threshold timeframe, such as within the past twenty-four hours or week. Articles that have been previously scraped or outside of the threshold timeframe may be ignored to limit processing overhead.

When web crawler 106 finds web content related to a current event, process 200 applies a named entity recognition model to the content to identify the name of an entity, if any, that is a subject of the target content (operation 206). A named entity recognition model may leverage machine learning to identify and extract entity names. Example models that may be used include hidden Markov models, conditional random fields, and artificial neural networks. The ML model may be trained to learn patterns that are indicative of whether a token in an article corresponds to a named entity. The model may account for patterns in various features including the position of a token in a sentence, the tokens preceding the token in the sentence, the tokens subsequent to the tokens in the sentence, and the part of speech of the token. As previously noted, a word or sequence of words in one context may refer to a company name whereas it might not in another context.

In some cases, the named entity recognition model is trained to identify company or organization names. Names of people or places may be ignored by the model. If the article does not include an entity name that is targeted, such as a company or other organization, then process 200 may proceed without further processing of the content and continue crawling for other target content.

If a named entity identified, then process 200 applies a machine learning model to tag entities with entity event categories based on the target content (operation 208). An NLP text classification model may be used to classify the document into one or more pre-defined event categories. The model may predict one or more event category labels to assign based on semantic meaning and patterns extrapolated from the text. Additionally or alternatively, process 200 may apply a sentiment analysis model to classify the content as positive, negative, or neutral. System 100 may use the current events and current sentiment of various companies, as estimated by the ML models, to build a segment as described further herein.

In some embodiments, the ML-assigned tags are set to expire. For example, an entity may be associated with an "expansion" tag based on a recent news article. The tag may be set to expire within a month or some other timeframe unless another article is detected about a subsequent expansion event within the threshold timeframe. The threshold timeframe may be exposed to and configured by an end user. Additionally or alternatively, the timeframe may be identical for all ML-assigned tags or may be different in length depending on the event category. For instance, positive sentiment tags may expire sooner than negative sentiment tags. Thus, the duration an event signal is associated with an entity may vary depending on the particular implementation.

Referring to FIG. 2, process 200 further generates an entity list based on the event category tags (operation 210). In some embodiments, an entity list is generated using one or more filter criteria, which may be specified using event tags, logical operators, and/or company attributes. For example, an entity list may include the condition: "IF HEADQUARTER_LOCATION<100 MILES FROM SAN JOSE, Calif. AND CURRENT EVENT SIGNAL==EXPANSION". Process 200 may then generate a list by identifying all companies with a headquarters within the threshold distance to San Jose that have recently had an expansion. The list may automatically be adjusted by system 100 without any human intervention such that companies are added and/or removed as AI-powered data enrichment service 104 detects new event signals and older event signals expire.

In some embodiments, an ML model may be trained to recommend or automatically select tags to use for a given application flow. An ML model may be trained based on example posts and resulting performance metrics. With a neural network, for example, an ML feature vector may be generated for each example, and the weights of the neurons may be trained using backpropagation. The trained ML model may then predict which event tag filters are most likely to yield the best performance, such as the highest click-through rates or the most positive engagement. System 100 may then recommend these tags to the user or automatically incorporate them into the entity list.

Once the list has been generated, process 200 identifies available contacts associated with entities on the entity list (operation 212). In some embodiments, the contacts include employees of a company is on the generated entity list. Process 200 may search a customer database to identify employees or other contacts that are associated with the target entities. For example process 200 may search for contacts that have an email address with a domain that matches a domain of the entity. If company "XYZ" is on the entity list and has a domain name "xyz.com" for instance, then process 200 may search for contacts with an email address having "xyz.com" in the domain. Additionally or alternatively, process 200 may search a database field that specifies the name of the company that employs the contact.

In some embodiments, information in the customer database may include sensitive data, which may be encrypted and otherwise protected by privacy engine 126 to prevent unauthorized access. Subscribers to data enrichment service 104 may have different proprietary customer lists. As a result, the same company on an entity list may result in different set of contacts being identified depending on the contacts available to the consuming application.

In some embodiments, process 200 records the list membership for each of the contacts in the database (operation 214). For example, a table of contacts in the database may include a field that identifies list membership for the contact. An entity may belong to more than one entity list depending on the current event signals that have been extracted and the event lists that have been generated. In some embodiments, list membership may expire as event signals associated with entities expire. System 100 may continually or periodically monitor for entity changes to the generated list. If a company is removed, then the database may be updated to remove the list membership for contacts associated with the company.

Process 200 next generates a segment based on the list membership (operation 216). In some embodiments, the segment may include all members of the list. In other embodiments, additional filters may be applied to reduce the segment to a subset of individuals on the list. For example, process 200 may filter contacts based on job title, office location, historical interactions, and/or other attributes. In some embodiments, segment membership for a campaign may be capped to a maximum amount to reduce costs and conserve resources. Segment membership may be selected to optimize predicted results, which may be based on one or more performance metrics as previously described.

Once the segment is generated, process 200 adds the segment to the application flow (operation 218). The segment may be presented to the user to review and edit before the application flow is executed. In other embodiments, the application flow may be executed without any further review by the user.

When the application flow is executed, process 200 triggers one or more automated actions based on the segment generated for the application flow (operation 220). In some embodiments, the segment membership is passed to data management platform 130 with privacy engine 126 applying one or more privacy filters before it is passed to protect sensitive contact data. For example, segment may comprise a list of cookie identifiers from past email clicks or hashed email identifiers to anonymize the data. In response to receiving the anonymized segment, data management platform 130 may create an audience for a targeted message. Data management platform 130 may then target the message such that it is rendered in social media sites, webpages, mobile applications, and/or other client-side applications being used by people whose employer was on the entity list. To determine whether a message is rendered on a given interface page of a client-side application, data management platform 130 may monitor interactions between client and service-side applications for the use of cookies, mobile identifiers, email hashes, and/or other unique identifiers that match the identifiers in the segment list. If a match is detected, then data management platform 130 may render the message such that it is displayed in a page of the client-side application, such as a webpage being viewed by a browser or an application page in a mobile application. If a match is not detected, then the page may be rendered without the targeted post.

In some embodiments, process 200 tracks the actions of members of the segment after being targeted by the one or more targeted actions. For example, process 200 may track whether the segment member engaged with a post, the sentiment of the user, and/or downstream actions taken by the user. Process 200 may further generate aggregate metrices for the entire segment, such as click-through rates for an online campaign message, average engagement metrics for a social media post, and/or other performance data. Process 200 may generate and present an analytic report that identifies the individual and/or aggregate performance data for a generated segment.

Additionally or alternatively, the performance data may be fed back to an ML model, which may add the example to the training data. The ML model may then be retrained or otherwise updated based on the new examples to enhance the prediction capabilities of the ML model. For instance, the weighting for different event categories may be adjusted to account for the new examples and reduce the model estimation error.

4. Example Interface for Defining Filter Criteria

As mentioned above, entity lists may be defined as a function of filter criteria, which may include entity attributes, logical operators, and event signal tags. Data enrichment service 104 may expose an API and/or GUI through which users may define filter criteria. For example, FIGS. 3A-3C illustrate an example set of interface pages through which a user may define filter criteria for an entity list in accordance with some embodiments. The example interfaces are described below for purposes of clarity. Components and/or operations described below should be understood as one specific example which may not be applicable to certain embodiments. Accordingly, the example interfaces described below should not be construed as limiting the scope of any of the claims.

FIG. 3A illustrates example interface page 302 for defining filter criteria based on company attributes in accordance with some embodiments. Interface page 302 includes a search box allowing the user to search for different filters and also presents a list of filters, which are hierarchical in nature. For example, selecting "Basic Company Info" presents filter options based on headcount, location, information about the company founding, the CEO name, company relationships, and the company name. In the present example, the user if viewing available headcount filters, which allows the user to filter out companies that have a headcount below and/or above a specified threshold. The user may use the GUI to select other filter options for specifying filter criteria. For example, the user may select "Location" and define a filter that the company must be within a threshold distance of a certain location or "Company Relationships" and specify that the company must be a subsidiary for a company with a headcount above a certain size if the company has less than a threshold headcount.

FIG. 3B illustrates example interface page 304 for defining filter criteria based on event signals in accordance with some embodiments. If the user selects "Signals" as depicted in interface page 302, then the user is presented with filter options that may be defined based on event signals. Example filter options depicted in interface page 304 include growth, financial, people, recognition, events and marketing, corporate update, negative news, and general news. Additionally or alternatively, other filter options may be presented, which may vary depending on the particular implementation. Further, event signal categories may be customizable by an end user.

Interface page 304 presents available filters based on negative news event signal categories. Example tags include bankruptcy, industry or competitive, customer dissatisfaction, financial challenges, executive or key person departure, layoffs, legal issues, regulatory issues, and security challenges. The event signal filters may be evaluated based on current event information as extracted by AI-powered web crawler 106. In the present example, the user has selected "Executive or Key Person Departure" and "Layoffs". Responsive to the user submitting the filters, data enrichment service 104 may search for entities tagged with one of these two labels based on recent events and add these entities to the entity list if the other filter criteria, if any, are also satisfied.

FIG. 3C illustrates example interface page 306 for defining filter criteria based on time-sensitive event signals in accordance with some embodiments. As illustrated, user interface page 306 presents an option to define a threshold timeframe for a layoff event signal. In the present example, the user has selected within the last year. Thus, companies that have not had a layoff within the last year may be excluded from the generated entity list.

In some embodiments, users may save a combination of filter criteria using an entity list name. For example, the user may define a list "Fortune 500 companies with layoffs in the past year" and another list "Small cap companies with layoffs in the past 6 months" to reflect different filter criteria associated lists. The named entity lists may be imported and reused by different application flows. For a given list, the segments that are generated by system 100 for each application flow may vary depending on the current event signals extracted by data enrichment service 104. For instance, a company that was on a list when a first application flow is executed may have been removed when a second application flow that uses the same entity list is executed. Additionally or alternatively, a company that was not included may have been added. As may be appreciated from the example interfaces illustrated above, the number of possible filter options and event signals may be extremely large. By leveraging real-time monitoring and machine learning, system 100 may generate segments based on information that a user does not know or has no way of knowing.

FIG. 4 illustrates example user interface page 402 presenting an entity list generated based on a set of specified filter criteria. User interface page 402 shows the company attributes and event filters that were used to generate the list. The user is given the option to add or remove filters. The entity list includes the company name, technographic information identifying various information about what technology is used by the company, and a uniform resource locator (URL) linking to a social media profile managed by the company.

5. Example Interface for Defining Application Flows

As mentioned above, users may define an application flow, which may comprise a sequence of executable steps to perform one or more automated actions. Application flow editor 122 may provide a GUI to facilitate and expedite the creation of application flows. For example, FIGS. 5A-5D illustrate an example set of interface pages where an application flow is defined in accordance with some embodiments. The example interfaces are described below for purposes of clarity. Components and/or operations described below should be understood as one specific example which may not be applicable to certain embodiments. Accordingly, the example interfaces described below should not be construed as limiting the scope of any of the claims.

Figure 5A:
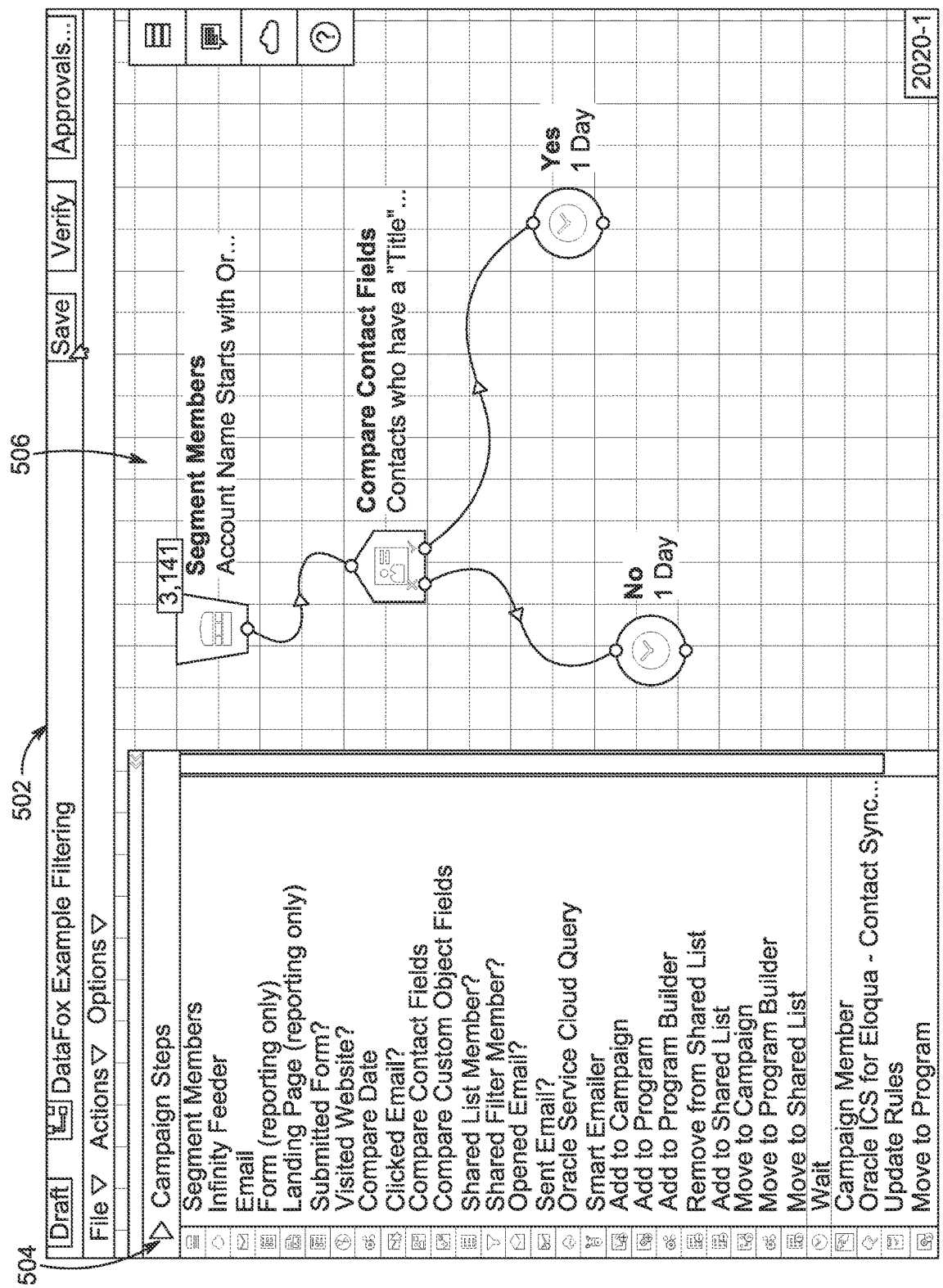
FIG. 5A illustrates an example interface page for defining an application flow in accordance with some embodiments.

FIG. 5A illustrates example interface page 502 for defining an application flow in accordance with some embodiments. Pane 504 of interface page 502 presents available steps to add to the application. The user may drag and drop icons representing different steps into display area 506, which displays the current set of steps. Further, the user may connect different executable steps with directed arrows to define the flow of data from one step to another and the sequence in which the steps are executed at runtime.

Figure 5B:
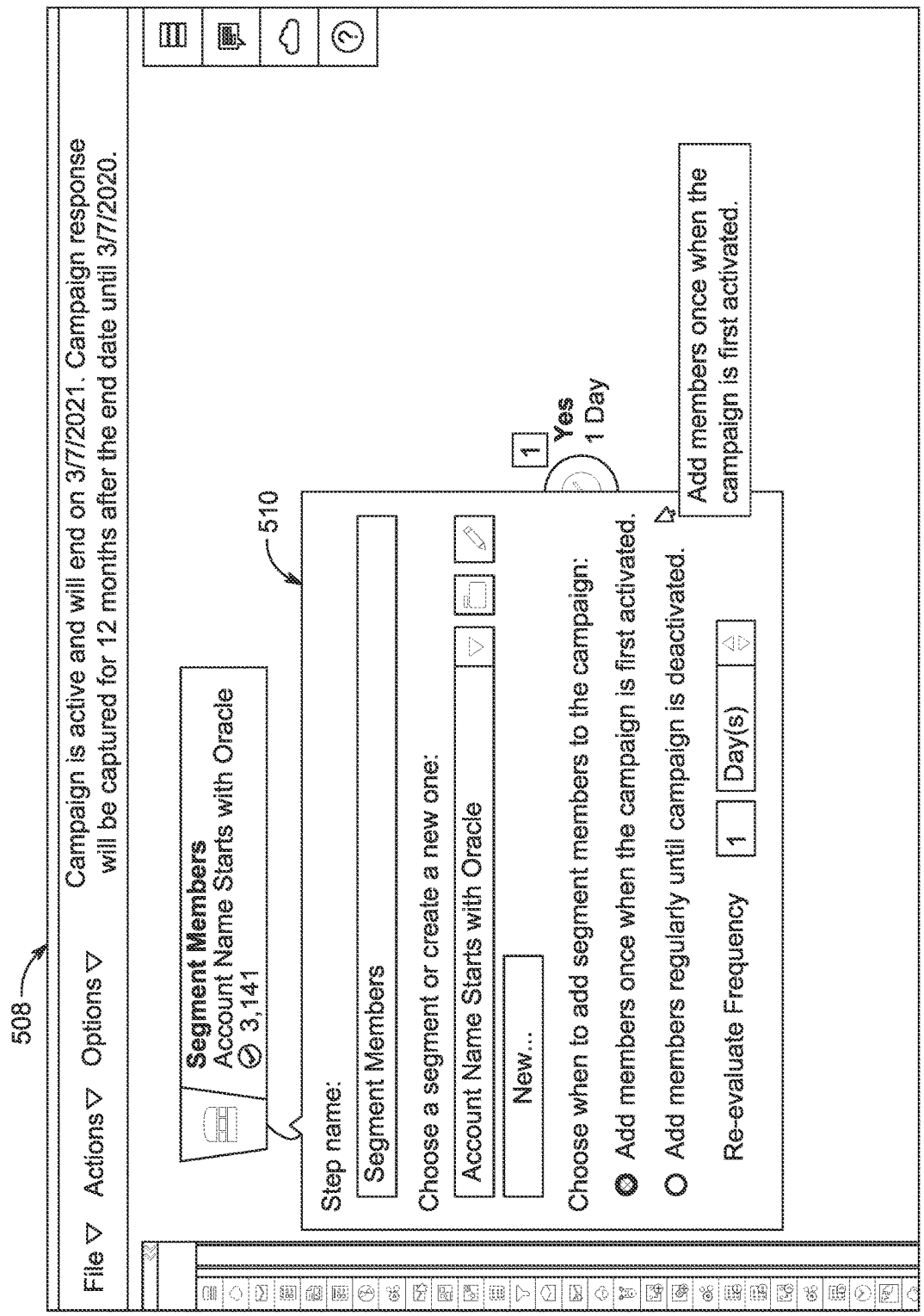
FIG. 5B illustrates an example interface page for defining criteria associated with generating a segment for a step in an application flow in accordance with some embodiments.

FIG. 5B illustrates example interface page 508 for defining criteria associated with generating a segment for a step in an application flow in accordance with some embodiments. When a user selects the "Segment Membership" step in display area 506, the GUI presents interface element 510 through which the user may select an entity list or create a new one. The user may further select to add members a single time when the campaign is first activated or add members regularly until the campaign is deactivated. In the former case, the segment is generated once when the application flow is first executed. In the latter case, the user may specify how often the segment is reevaluated. When the segment is reevaluated, entities may be added or removed from the entity list based on recent event signals. As a result, the list membership for a segment may change with individual added and/or removed.

Figure 5C:
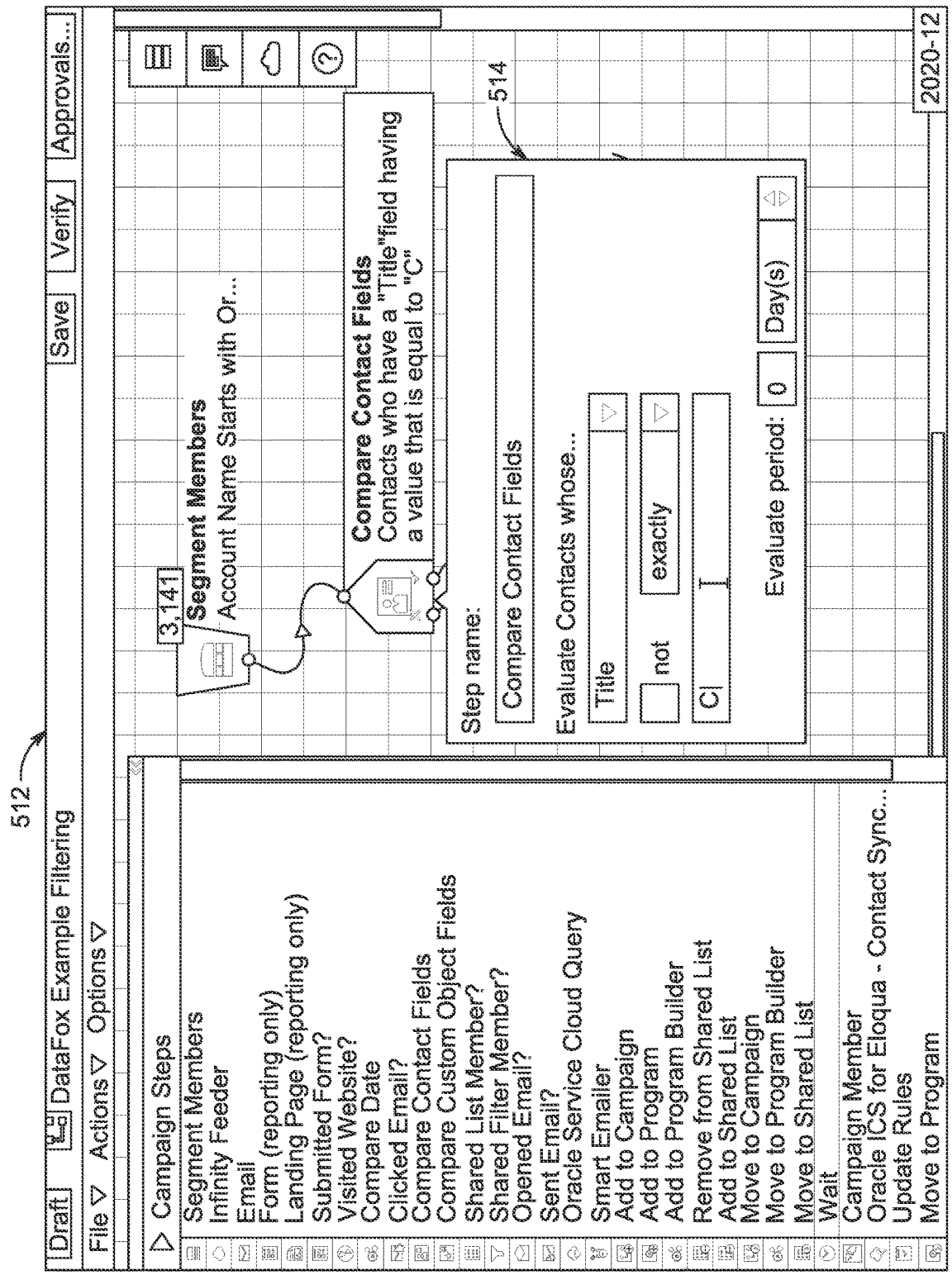
FIG. 5C illustrates an example interface page for defining segment filters in accordance with some embodiments.

FIG. 5C illustrates example interface page 512 for defining segment filters in accordance with some embodiments. When a user selects the "Compare Contact Fields" step in display area 506, the GUI presents interface element 514 through which the user may define filter criteria to refine the segment generated by the previous step of the application flow. In the example illustrated, the step compares the titles of each contacts to a specified title. The user may indicate whether an exact title match is required or if a similar match is sufficient. The user may further specify whether individuals with the title should be included in the list or excluded from the list. Additionally or alternatively, the user may compare the contact fields to other contact attributes, such as office location, years with the company, prior interactions, and/or other values.

Figure 5D:
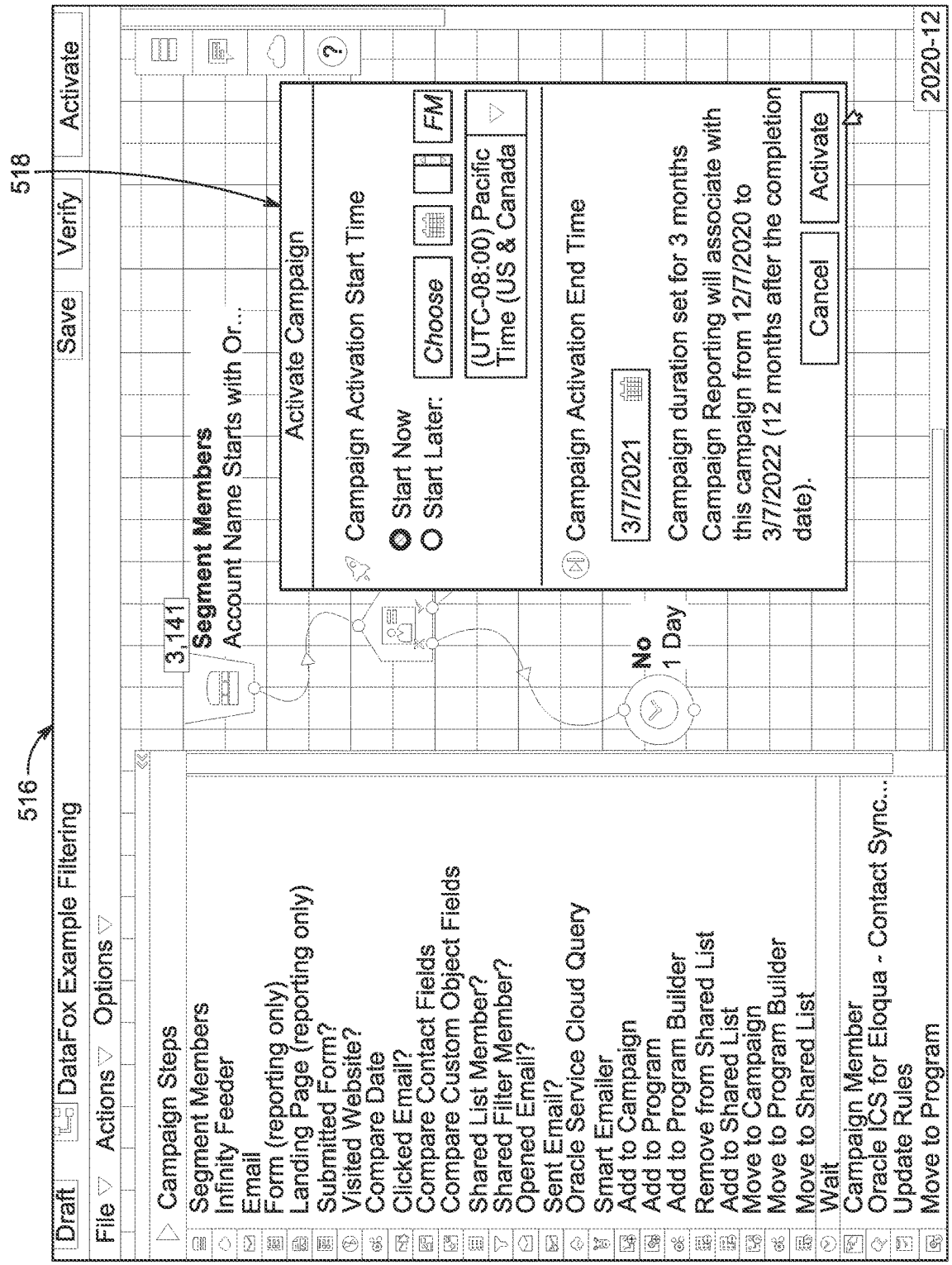
FIG. 5D illustrates an example interface page for activating an application flow in accordance with some embodiments.

FIG. 5D illustrates example interface page 516 for activating an application flow in accordance with some embodiments. When the user requests to execute the application flow, interface element 518 may be presented through which the user may define a start time to execute the campaign and an end time. Once activated, the application flow is executed, and the segment membership is generated at runtime based on the techniques described above. The segment membership may be periodically updated or computed a single time throughout the duration of the campaign.

6. Real-Time Monitoring of Competitor Behavior

In some embodiments, data enrichment service 104 may be leveraged to provide real-time monitoring and insights into the behavior of competitors. Application 118 may consume this information to provide real-time alerts and recommended actions to end users. Additionally or alternatively, application 118 may execute one or more actions based on the consumed data, such as activating a campaign or publishing a post on a social media channel.

Figure 6:
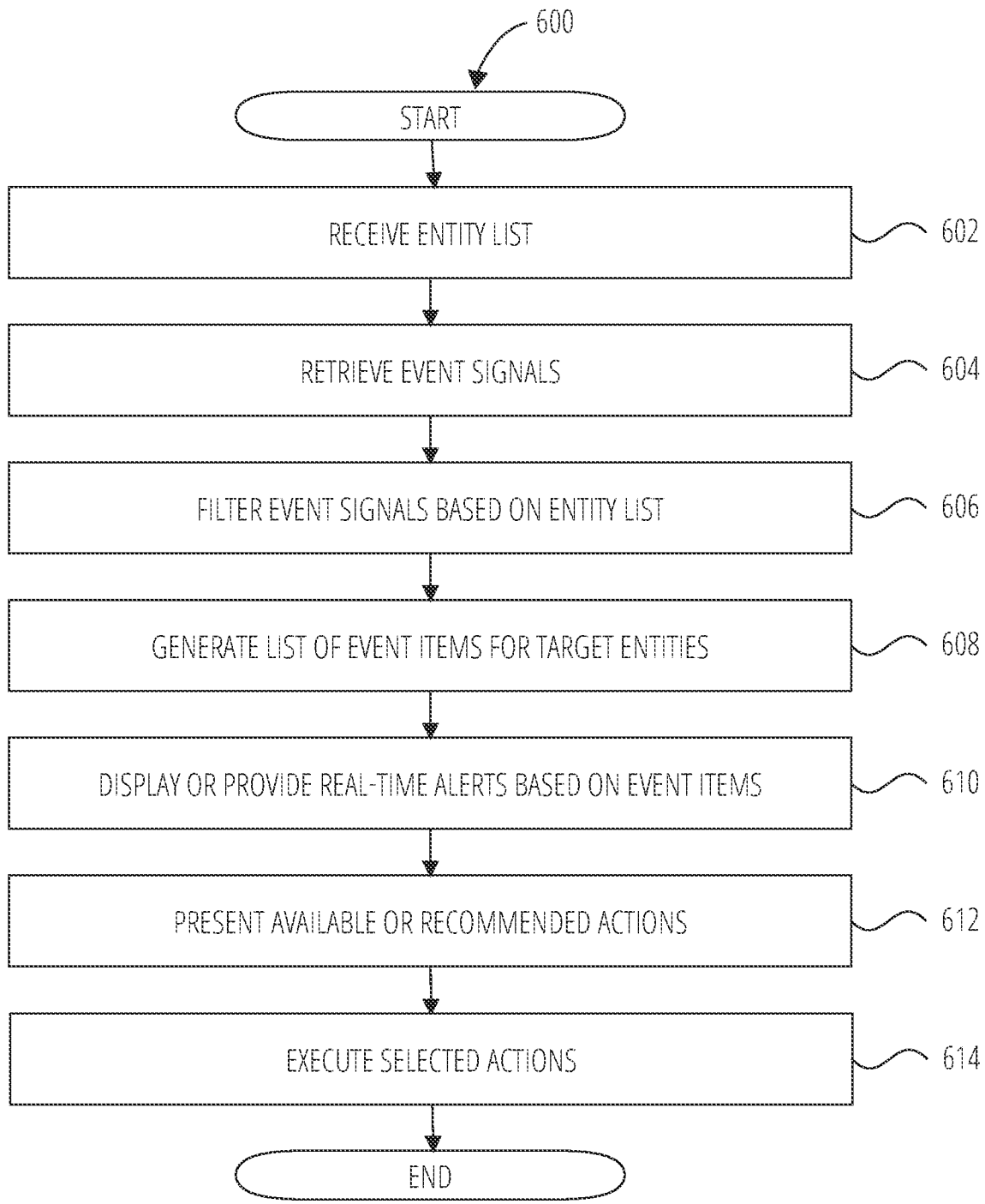
FIG. 6 illustrates an example process for targeting automated actions based on event signals in accordance with some embodiments.

FIG. 6 illustrates process 600 for targeting automated actions based on event signals in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

Referring to FIG. 6, process 600 includes receiving an entity list (operation 602). In some embodiments, the entity list is defined using a set of filter criteria such as previously described. In other embodiments, the entity list may specify the entity names that a user would like to target.

Process 600 further retrieves event signals for companies or other named entities (operation 604). Web crawler 106 may periodically or continuously monitor web resources 102 to search for and classify recent events related to target companies. If a new company is detected, then an entity profile for the company may be created by data enrichment service 104 and populated with company information including the detected event signals. If an entity profile already exists, then the event signals within the entity profile may be updated.

Process 600 next filters event signals based on the provided entity list (operation 606). In some embodiments, process 600 identifies event signals for all companies specified in the entity list or that satisfy the filter criteria of the entity list. Process 600 retains these event signals and filters the remaining signals.

Process 600 then returns a list of the remaining event items (operation 608). In some embodiments, data enrichment service 104 uses an API to push the list to application 118. In other embodiments, application 118 may periodically invoke an API to pull the list and subsequent updates to the list.

Process 600 further displays or provides real-time alerts based on the event items in the list (operation 610). For example, the list which companies had layoffs in the past year or some other timeframe. Additionally or alternatively, the list may present companies that have recently changed CEO and/or other key executives. Additionally or alternatively, the list may present other event signals.

In some embodiments, alerts are presented through or more application interfaces. For example, a new event signal for a competitor may be presented in a webpage, mobile application notification, chatbot, email, text message, or application GUI page.

Process 600 may further present available or recommended actions based on the event signals (operation 612). For example, the alert may indicate that a competitor recently signed a deal with a particular supplier and recommend contacting a similar supplier in the industry. As another example, an alert may recommend activating a particular campaign responsive to detecting that companies in a particular industry are expanding. The alert may allow the user to select a link, button, or other user interface element to view more information and/or execute the recommended actions.

Process 600 may further execute one or more selected actions (operation 614). For example, process 600 may activate a campaign, trigger a post, configure a system and/or execute any of the other actions described herein based on the real-time insights provided by data enrichment interface 120.

Figure 7:
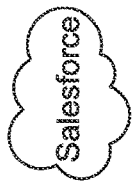
FIG. 7 illustrates an example interface page that presents events signals for an entity in accordance with some embodiments.
Figure 7:
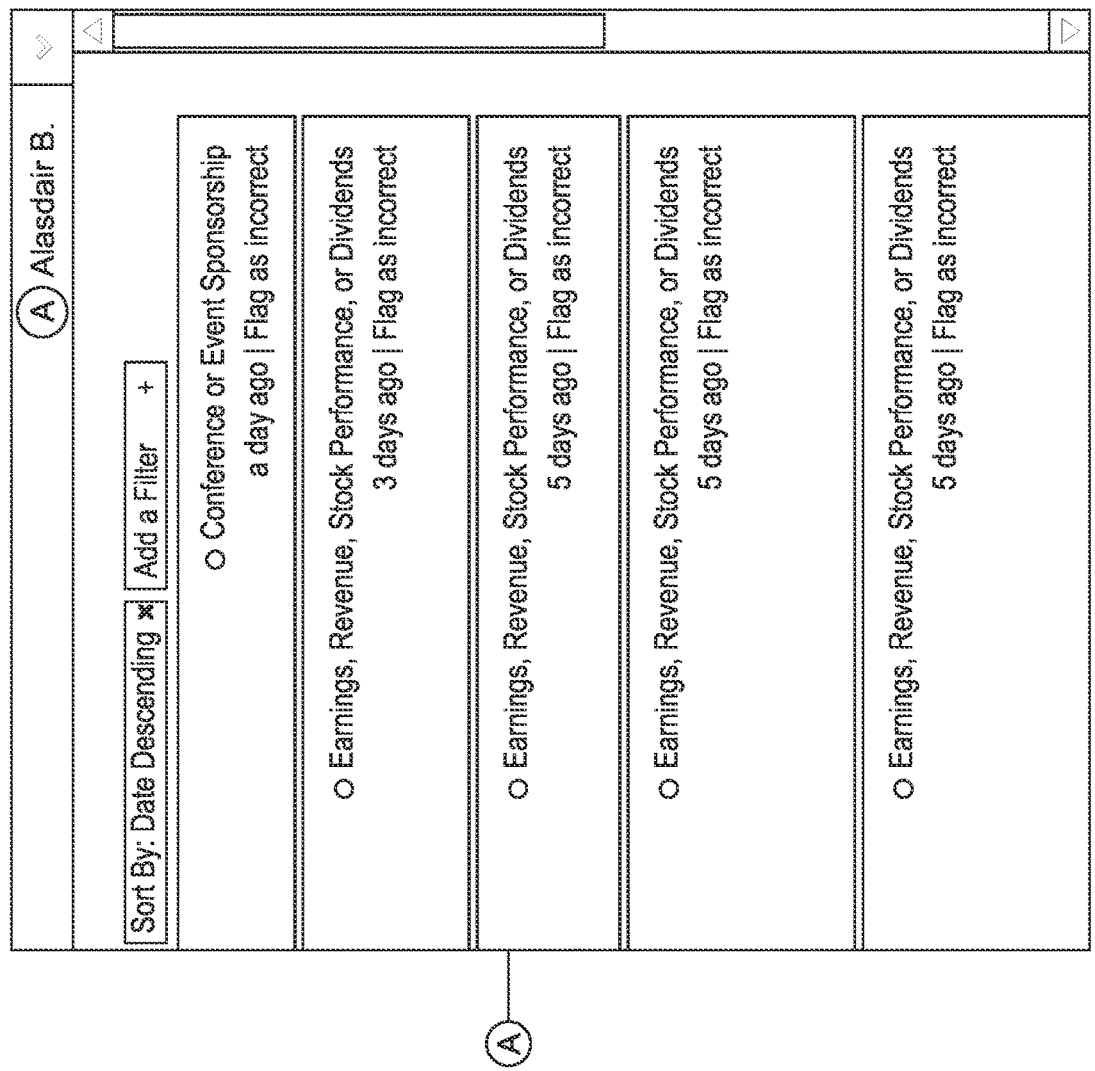

FIG. 7 illustrates example interface page 702 that presents events signals for an entity. Interface page 702 presents the entity name, information and associated links in pane 704. The event signals for the entity are displayed in display area 706. For each list item, the GUI presents a summary about the event, the categorization/tag for the event, and when the event happened. The user may scroll through the list events and select individual items to drill down and view more information about each event.

7. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
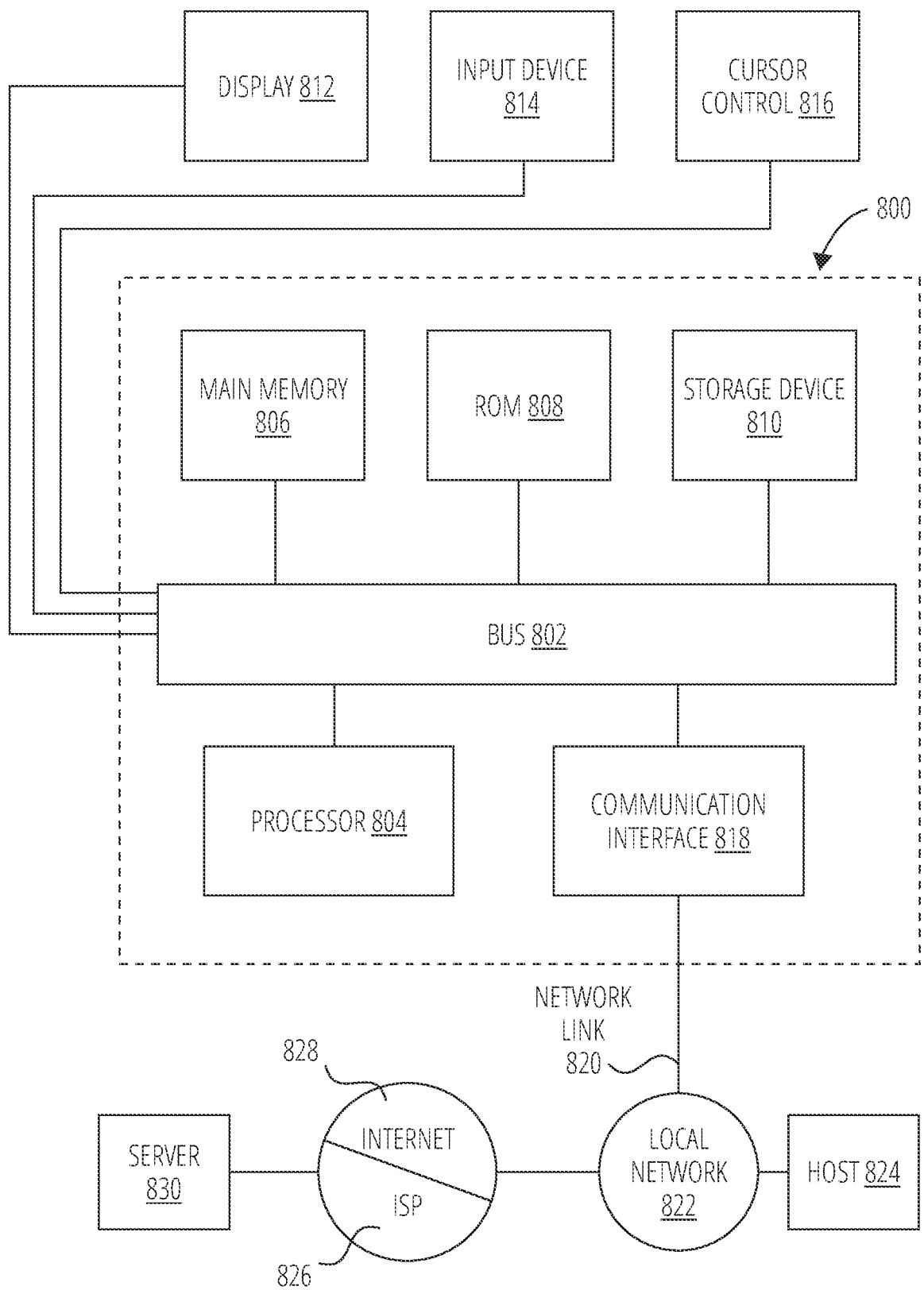
FIG. 8 shows a block diagram that illustrates a computer system in accordance with some embodiments.

For example, FIG. 8 is a block diagram that illustrates computer system 800 upon which some embodiments of the invention may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

9. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   training a machine-learning model to recognize entity names within unstructured web data; wherein training the machine-learning model includes receiving a set of labeled examples of web data and adjusting a set of model weights based on the set of labeled examples;
   receiving an application flow defining logic for triggering one or more automated actions for a candidate post on one or more channels, wherein the logic specifies filter criteria for identifying recipients of the candidate post, wherein the recipients of the candidate post are not known when the application flow is received;
   crawling a set of websites for target content;
   responsive to identifying target content, applying the machine-learning model to identify an entity name for an entity that is a subject of the target content, wherein applying the machine-learning model includes predicting, as a function of at least the weights, whether a set of one or more keywords within the target content correspond to the entity name;
   associating the entity with one or more event categories based on the target content;
   determining, based on at least one of the one or more event categories associated with the entity, that the entity satisfies the filter criteria specified in the logic defined by the application flow for triggering the one or more automated actions for the candidate post;
   identifying, based on an identifier for the entity, data records for a plurality of individuals associated with the entity;
   generating a segment for the application flow that includes data for at least a subset of the plurality of individuals associated with the entity; and
   triggering at least one of the one or more automated actions based on the segment generated for the application flow.

2. The method of claim 1, wherein the entity is not specified in the application flow defining the logic for triggering the one or more automated actions.

3. The method of claim 1, further comprising: generating a set of one or more cryptographic hashes for the subset of the plurality of individuals included in the segment; and sending the set of one or more cryptographic hashes to a data management platform; wherein the data management platform performs at least one of the one or more automated actions using the set of one or more cryptographic hashes for the subset of the plurality of individuals included in the segment.

4. The method of claim 3, wherein the data management platform monitors at least one social media channel or website for matches to the set of one or more cryptographic hashes; wherein responsive to detecting a match, the data management platform renders a graphical user interface object within a social media channel or website that was a source of the match.

5. The method of claim 1, wherein crawling the set of websites for target content comprises crawling, on a continuous or periodic basis, a set of verified news websites for webpages including target content about current events; wherein associating the entity with one or more event categories based on the target content comprises applying at least a second machine-learning model to the target content to estimate one or more classification labels for the target content.

6. The method of claim 1, wherein identifying, based on the identifier for the entity, records for the plurality of individuals associated with the entity includes executing a database query to fetch, from a database, email addresses with a domain matching a domain associated with the entity.

7. The method of claim 1, further comprising: identifying the subset of the plurality of individuals based on a second set of filter criteria defined by the application flow.

8. The method of claim 7, further comprising: updating, in a database, records for each individual in the subset of individuals by recording membership of the individual in a list associated with the application flow.

9. The method of claim 1, further comprising: tracking client-side actions performed by one or more client applications responsive to the one or more automated actions; and based on said tracking, generating an analytic report indicating an effectiveness of the one or more automated actions with respect to the generated segment.

10. A non-transitory computer-readable storage medium, the computer-readable storage medium including instructions that when executed by one or more hardware processors, cause:
   training a machine-learning model to recognize entity names within unstructured web data; wherein training the machine-learning model includes receiving a set of labeled examples of web data and adjusting a set of model weights based on the set of labeled examples;
   receiving an application flow defining logic for triggering one or more automated actions for a candidate post on one or more channels, wherein the logic specifies filter criteria for identifying recipients of the candidate post, wherein the recipients of the candidate post are not known when the application flow is received;
   crawling a set of websites for target content;
   responsive to identifying target content, applying the machine-learning model to identify an entity name for an entity that is a subject of the target content, wherein applying the machine-learning model includes predicting, as a function of at least the weights, whether a set of one or more keywords within the target content correspond to the entity name;
   associating the entity with one or more event categories based on the target content;
   determining, based on at least one of the one or more event categories associated with the entity, that the entity satisfies the filter criteria specified in the logic defined by the application flow for triggering the one or more automated actions for the candidate post;
   identifying, based on an identifier for the entity, data records for a plurality of individuals associated with the entity;
   generating a segment for the application flow that includes data for at least a subset of the plurality of individuals associated with the entity; and triggering at least one of the one or more automated actions based on the segment generated for the application flow.

11. The computer-readable storage medium of claim 10, wherein the entity is not specified in the application flow defining the logic for triggering the one or more automated actions.

12. The computer-readable storage medium of claim 10, wherein the instructions further cause: generating a set of one or more cryptographic hashes for the subset of the plurality of individuals included in the segment; and sending the set of one or more cryptographic hashes to a data management platform; wherein the data management platform performs at least one of the one or more automated actions using the set of one or more cryptographic hashes for the subset of the plurality of individuals included in the segment.

13. The computer-readable storage medium of claim 12, wherein the data management platform monitors at least one social media channel or website for matches to the set of one or more cryptographic hashes; wherein responsive to detecting a match, the data management platform renders a graphical user interface object within a social media channel or website that was a source of the match.

14. The computer-readable storage medium of claim 10, wherein crawling the set of websites for target content comprises crawling, on a continuous or periodic basis, a set of verified news websites for webpages including target content about current events; wherein associating the entity with one or more event categories based on the target content comprises applying at least a second machine-learning model to the target content to estimate one or more classification labels for the target content.

15. The computer-readable storage medium of claim 10, wherein identifying, based on the identifier for the entity, records for the plurality of individuals associated with the entity includes search a database for email addresses with a domain matching a domain associated with the entity.

16. The computer-readable storage medium of claim 10, wherein the instructions further cause: identifying the subset of the plurality of individuals based on a second set of filter criteria defined by the application flow.

17. The computer-readable storage medium of claim 16, wherein the instructions further cause: updating, in a database, records for each individual in the subset of individuals by recording membership of the individual in a list associated with the application flow.

18. A system comprising:
one or more hardware processors; and
one or more memories storing instructions that, when executed by the one or more hardware processors, configure the system to:

training a machine-learning model to recognize entity names within unstructured web data; wherein training the machine-learning model includes receiving a set of labeled examples of web data and adjusting a set of model weights based on the set of labeled examples;

receiving an application flow defining logic for triggering one or more automated actions for a candidate post on one or more channels, wherein the logic specifies filter criteria for identifying recipients of the candidate post, wherein the recipients of the candidate post are not known when the application flow is received;

crawling a set of websites for target content;

responsive to identifying target content, applying the machine-learning model to identify an entity name for an entity that is a subject of the target content, wherein applying the machine-learning model includes predicting, as a function of at least the weights, whether a set of one or more keywords within the target content correspond to the entity name;

associating the entity with one or more event categories based on the target content;

determining, based on at least one of the one or more event categories associated with the entity, that the entity satisfies the filter criteria specified in the logic defined by the application flow for triggering the one or more automated actions for the candidate post;

identifying, based on an identifier for the entity, data records for a plurality of individuals associated with the entity;

generating a segment for the application flow that includes data for at least a subset of the plurality of individuals associated with the entity; and triggering at least one of the one or more automated actions based on the segment generated for the application flow.

19. The system of claim 18, wherein the entity is not specified in the application flow defining the logic for triggering the one or more automated actions.

20. The system of claim 18, wherein the instructions further configure the system to: generate a set of one or more cryptographic hashes for the subset of the plurality of individuals included in the segment; and send the set of one or more cryptographic hashes to a data management platform; wherein the data management platform performs at least one of the one or more automated actions using the set of one or more cryptographic hashes for the subset of the plurality of individuals included in the segment.

* * * * *